(12) United States Patent
Yokoi

(10) Patent No.: US 9,896,220 B2
(45) Date of Patent: Feb. 20, 2018

(54) AIRCRAFT ANTENNA COVER, AIRCRAFT MEMBER COVER, AIRCRAFT, AND RAIN EROSION BOOT FOR AIRCRAFT

(71) Applicant: MITSUBISHI AIRCRAFT CORPORATION, Aichi (JP)

(72) Inventor: Takashi Yokoi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 32 days.

(21) Appl. No.: 14/670,629

(22) Filed: Mar. 27, 2015

(65) Prior Publication Data

US 2016/0031568 A1 Feb. 4, 2016

(30) Foreign Application Priority Data

Jul. 30, 2014 (JP) ................................. 2014-155345

(51) Int. Cl.
| H02H 1/00 | (2006.01) |
| B64D 45/02 | (2006.01) |
| B64C 1/36 | (2006.01) |
| H01Q 1/42 | (2006.01) |
| H01Q 1/28 | (2006.01) |
| H01Q 1/50 | (2006.01) |

(52) U.S. Cl.
CPC ............... *B64D 45/02* (2013.01); *B64C 1/36* (2013.01); *H01Q 1/281* (2013.01); *H01Q 1/42* (2013.01); *H01Q 1/50* (2013.01)

(58) Field of Classification Search
USPC .......................................... 361/212, 220, 218
See application file for complete search history.

(56) References Cited

U.S. PATENT DOCUMENTS

| 5,323,170 A | * | 6/1994 | Lang | ........................ | H01Q 1/42 |
| | | | | | 343/705 |
| 2005/0041362 A1 | * | 2/2005 | Hall | ........................ | B64D 45/02 |
| | | | | | 361/225 |
| 2010/0025533 A1 | * | 2/2010 | Bimanand | ............... | B32B 27/08 |
| | | | | | 244/121 |

FOREIGN PATENT DOCUMENTS

| JP | 2013-536776 A | 9/2013 |
| WO | 2012/031168 A1 | 3/2012 |

\* cited by examiner

*Primary Examiner* — Danny Nguyen
(74) *Attorney, Agent, or Firm* — Pearne & Gordon LLP

(57) ABSTRACT

An antenna cover of an aircraft including: a cover that protects an antenna mounted in the aircraft; a conductive layer having conductivity that is provided on an outer side of the cover; and a rain erosion boot that covers one region of the conductive layer, wherein the rain erosion boot includes a main material having an insulating property, is given conductivity, and is grounded to an airframe via the conductive layer, or the rain erosion boot includes a main material having an insulating property, and is given hydrophilicity.

19 Claims, 4 Drawing Sheets

AIRCRAFT ANTENNA COVER, AIRCRAFT MEMBER COVER, AIRCRAFT, AND RAIN EROSION BOOT FOR AIRCRAFT

BACKGROUND OF THE INVENTION

Field of the Invention

The present invention relates to an aircraft antenna cover, an aircraft member cover, an aircraft, and a rain erosion boot for an aircraft.

Description of the Related Art

An antenna of a radar system mounted in aircraft is protected from wind and rain, sunlight, or the like by a bowl-shaped cover (called a radome). For example, the radome is formed of an insulating member in which a porous member is sandwiched between thin sheet materials.

When the radome is charged by friction with raindrops, snow, sand or the like, and the electrification charge is accumulated to cause an electrostatic discharge, there may occur a problem that noise is mixed into radio waves transmitted and received by the radar system. To prevent the problem, a conductive coating is applied to a surface of a substrate of the radome formed of an insulating material. The conductive coating is grounded to a metal member of an airframe. By transferring and diffusing the electrification charge into the airframe via the conductive coating, the electrostatic discharge is prevented.

The conductive coating covers the surface of the substrate of the radome to inhibit erosion of the substrate by rain impact, sand and dust, or the like, and thereby also functions to maintain high power transmittance of the substrate.

In addition to the conductive coating described above, a rain erosion boot that covers the conductive coating and inhibits erosion of the substrate by moisture, sand and dust, or the like over a long period of time is used. The rain erosion boot is formed in a film shape from a resin material such as polyurethane (JP2013-536776A). The rain erosion boot is provided at a front end portion of the radome to which a large load is applied by impact of raindrops, sand, or the like.

The rain erosion boot described above has an electrically insulating property, and keeps at the place and accumulates P-Static (Precipitation Static) charge generated by friction with raindrops, snow, sand, or the like. When an electric field strength by the accumulated electrification charge exceeds a dielectric breakdown strength of the rain erosion boot, a corona discharge, or an arc discharge and a streamer discharge occur from the rain erosion boot toward the conductive coating. These discharge phenomena due to P-Static are white noise, and cause electromagnetic interference in a communicator or a navigation receiver in a 100 MHz-band. Also, if a pinhole is formed in the conductive coating or the substrate by the discharge, erosion is caused by rain impact, sand, or the like, thereby resulting in a decrease in the power transmittance of the substrate.

That is, while the rain erosion boot is provided in order to reliably protect the substrate of the radome from erosion, the object of providing the rain erosion boot cannot be achieved if the discharge occurs due to the charge electrified on the rain erosion boot.

The corona discharge, the arc discharge and the streamer discharge described above are referred to as a "P-Static" in the present specification.

An object of the present invention is to ensure a cover erosion prevention effect by a rain erosion boot that protects a cover for covering an antenna mounted in an aircraft by preventing occurrence of a P-Static charge caused by friction between the rain erosion boot and raindrops, snow, sand, or the like.

The present invention is not limited to the antenna, and another object thereof is to prevent erosion and abrasion of a cover for covering various members mounted in an aircraft while preventing occurrence of a P-Static charge caused by friction with raindrops, snow, sand, or the like.

SUMMARY OF THE INVENTION

An aircraft antenna cover according to the present invention includes: a cover that protects an antenna mounted in the aircraft; a conductive layer having conductivity that is provided on an outer side of the cover; and a rain erosion boot (a protective member) that covers one region of the conductive layer.

Any rain erosion boot described in the present specification prevents infiltration of moisture such as raindrops, or sand etc.

In the present invention, the rain erosion boot includes a main material having an insulating property, is given conductivity, and is grounded to an airframe via the conductive layer.

"Is given conductivity" includes giving conductivity to the entire rain erosion boot by mixing conductive particles or a conductive filler therein, and giving conductivity only to a surface of the rain erosion boot by forming a film or a layer having conductivity on a surface of the main material.

For example, a sheet that is formed of a polymer compound such as polyurethane and polyethylene can be used for the rain erosion boot. A thickness of the rain erosion boot is preferably $1/100$ or less of a wavelength used by the antenna.

In accordance with the present invention, since the rain erosion boot is given conductivity, electrification charge on the rain erosion boot can be transferred and diffused into the airframe via the conductive layer before an electric field strength by the electrification charge reaches a dielectric breakdown strength. Accordingly, an electrostatic discharge can be prevented from occurring. Since an erosion prevention effect demanded in the rain erosion boot can be thereby secured, it is possible to reliably protect the antenna cover from erosion by rain impact, sand, or the like even when the antenna cover is used for a long period of time.

In the antenna cover of an aircraft according to the present invention, surface resistivity of the rain erosion boot is preferably 0.5 MΩ/sq to 15 MΩ/sq (0.5 MΩ/sq or more and 15 MΩ/sq or less).

When the surface resistivity of the rain erosion boot is 15 MΩ/sq or less, charge sufficiently moves within the rain erosion boot. Thus, the electrification charge on the rain erosion boot can be reliably transferred and diffused into the airframe via the conductive layer. An electrostatic discharge prevention effect obtained when the rain erosion boot "is given conductivity" in the present invention can be more reliably obtained when the surface resistivity of the rain erosion boot is 15 MΩ/sq or less. When the surface resistivity of the rain erosion boot is 15 MΩ/sq or less, conductivity necessary for achieving the electrostatic discharge prevention can be obtained not only in a case in which molecular structures of the conductive particles dispersed over the main material of the rain erosion boot are fully linked together in a network fashion, but also in a case in which the molecular structures are partially missing. When the molecular structures are partially missing, the charge flows by detouring a missing portion.

When the surface resistivity of the rain erosion boot is 0.5 MΩ/sq or more, it is possible to suppress interference of the rain erosion boot with radio waves. Thus, power transmittance required in the antenna cover can be ensured.

In the aircraft antenna cover according to the present invention, it is preferable that the conductive layer has a portion that is covered with the rain erosion boot, and a portion where a lightning protection member through which a current of lightning striking the cover flows is arranged, and the conductive layer is grounded to the aircraft via a fastener that penetrates the conductive layer in a thickness direction and fastens the lightning protection member to the cover.

Accordingly, the fastener that fastens the lightning protection member to the cover can be used as a conduction member that transfers charge electrified on the outer side of the cover to a back side of the cover.

An aircraft antenna cover according to the present invention includes: a cover that protects an antenna mounted in the aircraft; a conductive layer having conductivity that is provided on an outer side of the cover; and a rain erosion boot that covers one region of the conductive layer. In the present invention, the rain erosion boot includes a main material having an insulating property, and is given hydrophilicity.

Since the rain erosion boot in the present invention is given hydrophilicity, the rain erosion boot is prevented from being charged with static electricity.

In accordance with the present invention, since the rain erosion boot is given hydrophilicity, charge electrified on the rain erosion boot by friction with raindrops, snow, or sand is neutralized by ion of water adsorbed by the rain erosion boot exerting hydrophilicity. The electrification charge can be removed by the action before an electric field strength by the electrification charge reaches a dielectric breakdown strength. Accordingly, an electrostatic discharge can be prevented from occurring. Since an erosion prevention effect demanded in the rain erosion boot can be thereby secured, it is possible to reliably protect the antenna cover from erosion by rain impact, snow, sand, or the like even when the antenna cover is used for a long period of time.

In the aircraft antenna cover according to the present invention, it is preferable that the antenna is mounted at a front end of the airframe, the cover is formed in a bowl shape so as to cover the antenna from a front side, the conductive layer is applied to an entire outer surface of the cover, and the rain erosion boot is provided in a predetermined region located at a front end of the cover.

In the present specification, a front side in a traveling direction of the aircraft is defined as "front", and a side opposite thereto is defined as "rear".

An aircraft member cover according to the present invention includes: a cover that protects a member mounted in the aircraft; and a rain erosion boot that covers an outer side of the cover. In the present invention, the rain erosion boot includes a main material having an insulating property, and is given conductivity or hydrophilicity.

For example, a light device emitting light is employed as the aircraft member. In this case, the light emitted from the light device is transmitted through the cover.

When the rain erosion boot is given conductivity, charge electrified on the rain erosion boot by friction with raindrops, snow, or sand can be transferred and diffused to outside of the rain erosion boot before an electric field strength by the electrification charge reaches a dielectric breakdown strength. Accordingly, occurrence of an electrostatic discharge by the charge electrified on the rain erosion boot can be prevented. Therefore, the rain erosion boot can protect the cover from abrasion, crack generation, erosion or the like without causing a problem that the cover is damaged by the electrostatic discharge.

An aircraft according to the present invention includes the above antenna cover, or the above member cover.

An aircraft rain erosion boot according to the present invention is a rain erosion boot that is provided on an outer side of a cover that protects a member mounted in the aircraft, wherein the rain erosion boot includes a main material having an insulating property, and is given conductivity or hydrophilicity.

In accordance with the present invention, it is possible to ensure the cover erosion prevention effect by the rain erosion boot that protects the cover for covering the member mounted in the aircraft by preventing the occurrence of the electrostatic discharge caused by friction between the rain erosion boot and raindrops, snow, sand, or the like.

BRIEF DESCRIPTION OF THE DRAWINGS

FIG. 4A is a view of a state in which a lens cover is opened; and FIG. 4B is a sectional view along a line IVb-IVb of the lens cover in FIG. 4A.

DETAILED DESCRIPTION OF THE PREFERRED EMBODIMENTS

In the following, embodiments of the present invention are described by reference to the accompanying drawings.

First Embodiment

Figure 1:
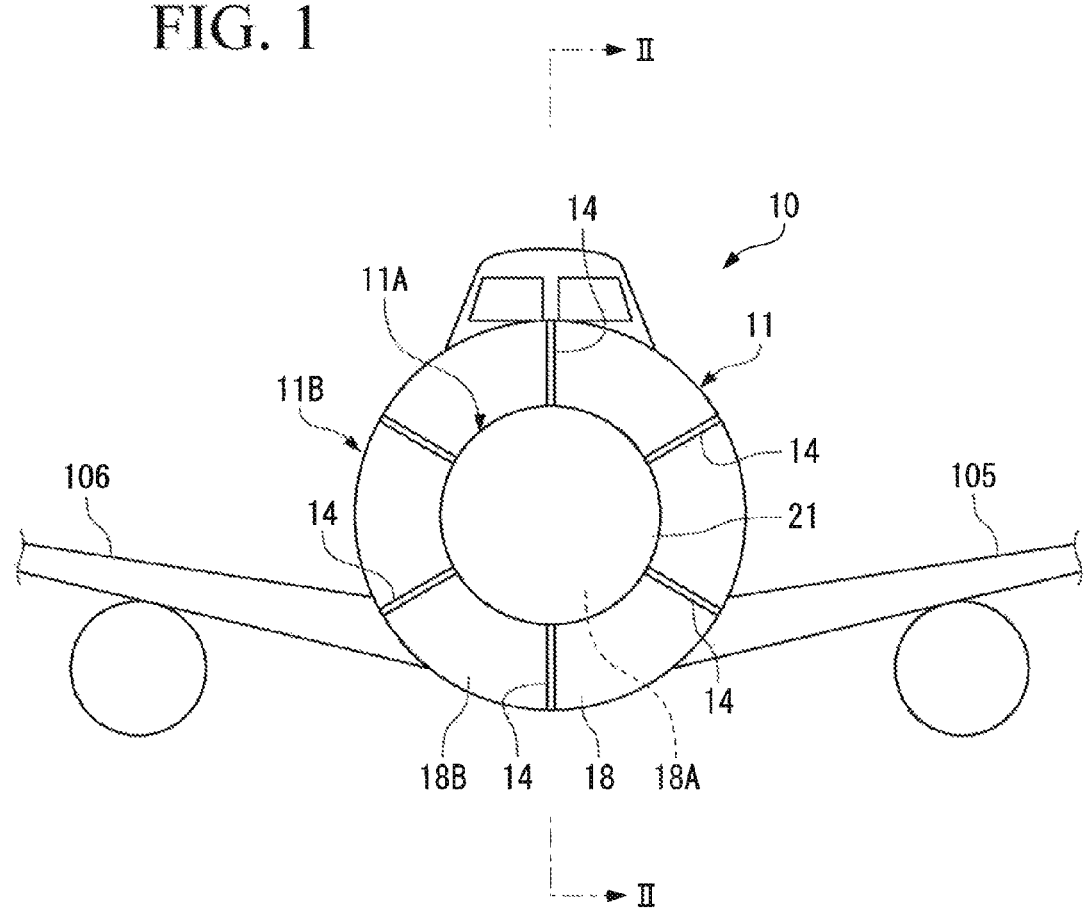
FIG. 1 is a front view of an aircraft according to a first embodiment of the present invention.

An aircraft 10 shown in FIG. 1 includes a radome (an aircraft antenna cover, an aircraft member cover) 11 at a front end. The radome 11 protects an antenna 12 (FIG. 2) that constitutes a radar system from wind and rain, sand and dust, sunlight or the like. The antenna 12 transmits radio waves, and receives radio waves reflected from an object. The radar system detects location information regarding rainfall and thunderclouds, location information regarding a ground surface on which the aircraft is to land, or the like based on a correlation between the transmitted and received radio waves. The location information can be detected over a wide area by vertically and horizontally changing a direction of the antenna 12.

Figure 2:
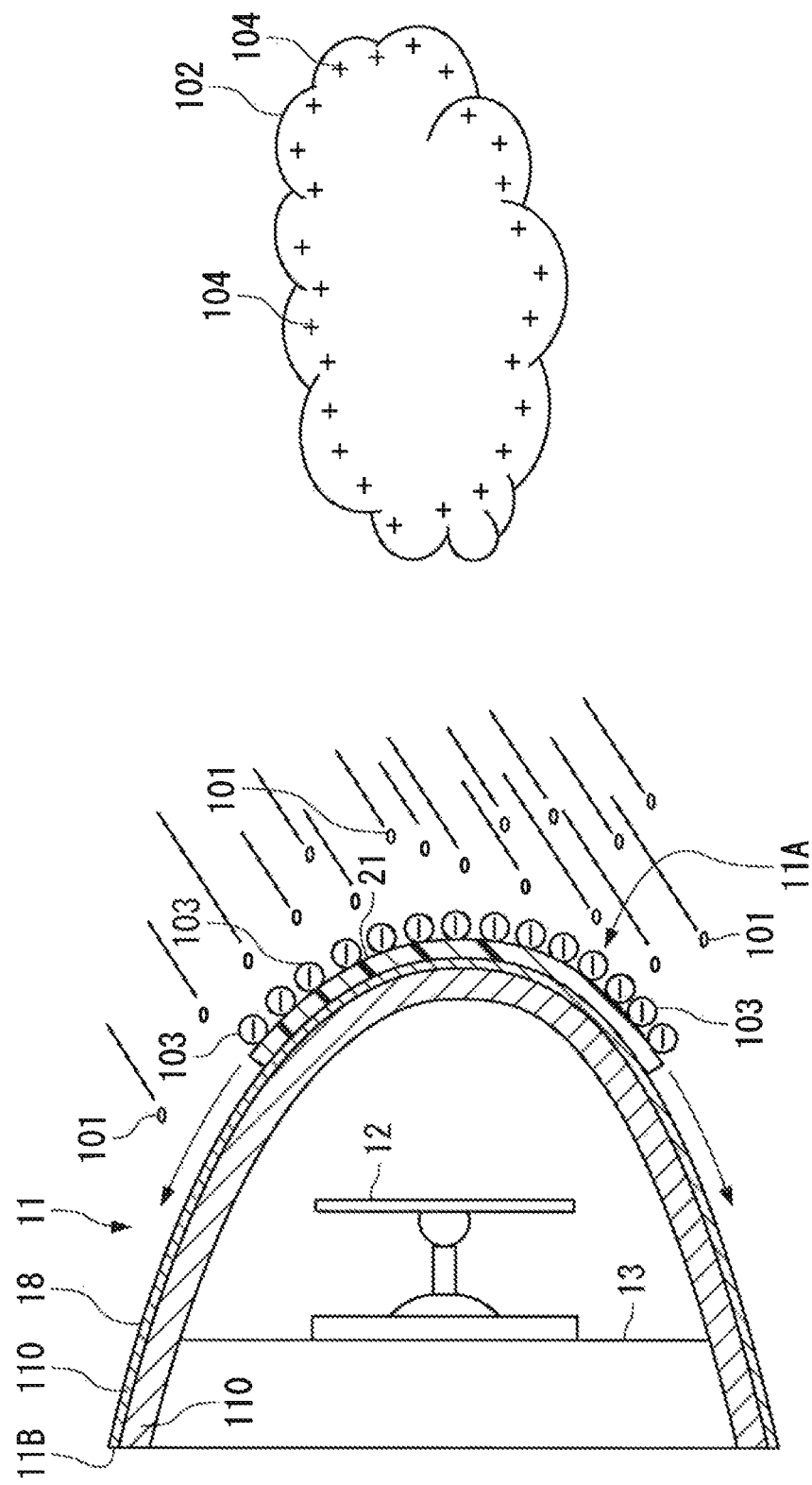
FIG. 2 is a sectional view along an arrow II-II of a radome in FIG. 1.

The radome 11 is formed in a bowl shape so as to conceal the antenna 12 provided on an installation section 13 in an airframe as shown in FIG. 2. More specifically, the radome 11 may have a hemispherical shape or a conical shape.

To decrease air resistance of the aircraft 10, the radome 11 is formed so as to become gradually smaller toward a front side from a rear end 11B that is smoothly connected to the airframe.

Figure 3:
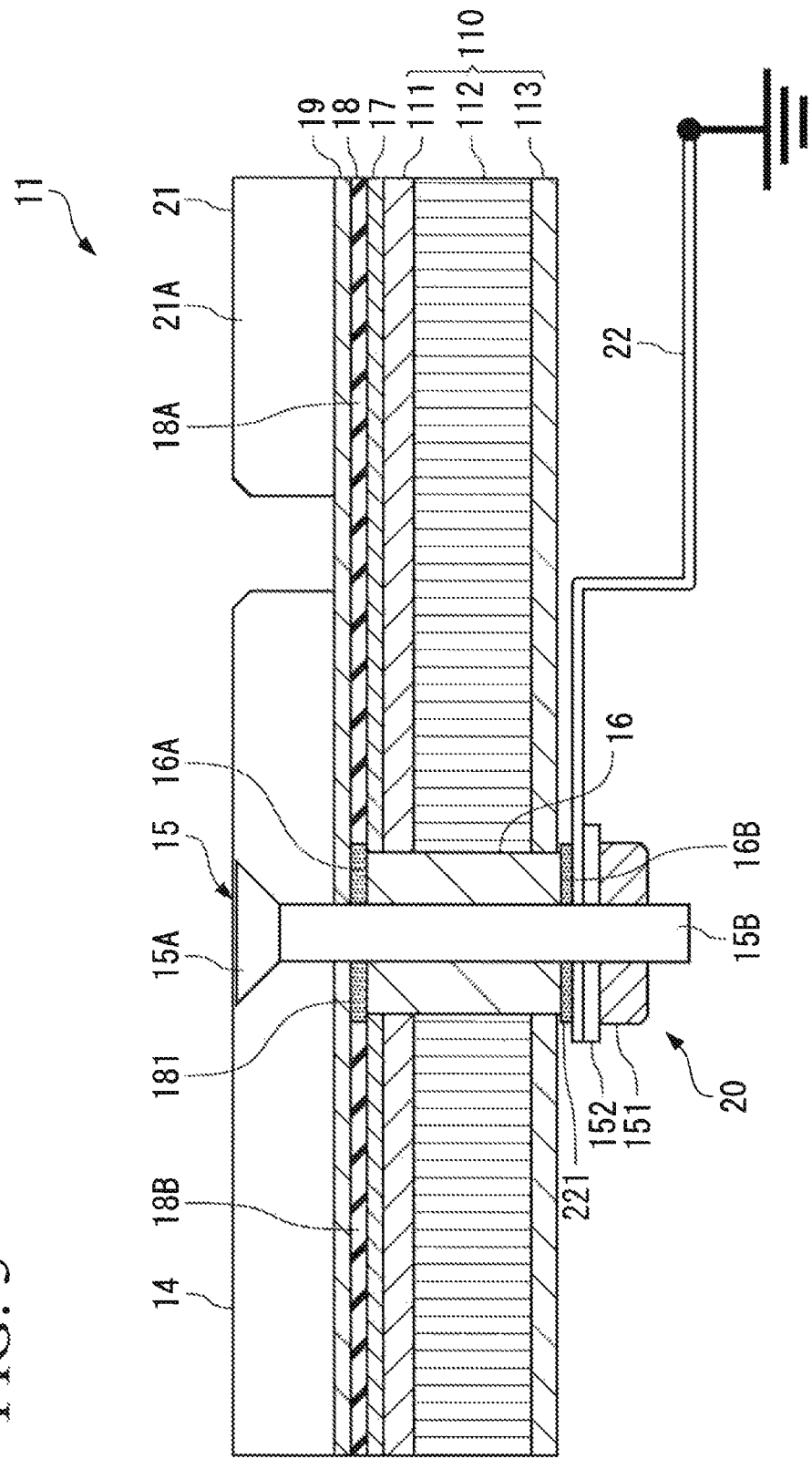
FIG. 3 is an enlarged schematic view of a sandwich panel, a conductive coating, and a rain erosion boot constituting the radome.

The radome 11 is a sandwich panel, which includes a core 112, an outer skin 111 provided on an outer side of the core 112, and an inner skin 113 provided on an inner side of the core 112 as shown in FIG. 3.

For example, the outer skin 111 and the inner skin 113 can be formed of a fiber reinforced resin containing glass fiber as reinforcement fiber (GFRP; glass fiber reinforced plastics). The outer skin 111 and the inner skin 113 can be formed to a thickness of, for example, several mm.

The core 112 has a structure including a number of pores therein. For example, a porous structure having a number of bubbles, or an assembly of polygonal cells represented by a honeycomb structure can be employed as the structure of the core 112.

For example, the core 112 is formed of a resin material such as a polyimide resin, or a fiber reinforced resin containing reinforcement fiber. As the fiber reinforced resin, GFRP, QFRP (quartz fiber reinforced plastics) containing quartz (silica) as reinforcement fiber, or the like can be used.

Radio waves are transmitted through air included in each cell of the core 112 without being attenuated. Since the outer skin 111 and the inner skin 113 are sufficiently thin, radio waves are transmitted therethrough almost without being attenuated.

Therefore, power transmittance that is a power ratio between transmitted power Pt and received power Pr transmitted through the radome 11 is sufficiently high.

Radio waves over a wide frequency band can be transmitted through the radome 11.

The respective materials of the outer skin 111, the inner skin 113, and the core 112 are not limited to those described above. Any material through which the radio waves transmitted and received by the antenna 12 are transmitted can be used.

Strips (lightning protection member) 14 made of metal (FIG. 1) that pass a large current of lightning striking the radome 11 to the airframe are provided on an outer surface of the radome 11. The strips 14 are not shown in FIG. 2. The plurality of strips 14 are radially arranged from a front end 11A of the radome 11 toward the rear end 11B of the radome 11. The strips 14 function to prevent the antenna 12 in the radome 11 from being struck by lightning, and are provided with an appropriate length according to a creeping flashover voltage of the radome 11 in a lightning strike. To avoid reflection or scattering of radio waves by the strips 14, it is preferable to arrange front ends of the strips 14 behind an opening surface of the antenna 12 as much as possible.

A segment-type strip in which button-shaped members are continuously provided may also be employed instead of the rod-shaped strip 14 as a lightening protection member of the radome 11.

Each of the strips 14 is fastened to the radome 11 by a fastener 15 that penetrates the strip 14 and a substrate (a cover) 110 that is a main body of the radome 11 in a thickness direction of the radome 11 as shown in FIG. 3. Each of the strips 14 is also grounded to the airframe via a conduction member 20 including the fastener 15.

The radome 11 is provided with a sleeve 16 for passing the fastener 15 that fastens each of the strips 14.

Friction is generated between the radome 11 and all kinds of flying objects and floating objects 101 (FIG. 2) in the atmosphere, such as rain, snow, hail, sand, and volcanic ash, at the front end of the flying aircraft 10. The radome 11 is charged by the friction. If an electrostatic discharge occurs due to the P-Static electrification charge, there may occur a problem that noise is mixed into radio waves. There are a lot of restrictions in giving conductivity or hydrophilicity to the radome 11 itself in order to prevent the electrostatic discharge since it is necessary to ensure the power transmittance and avoid distortion of an antenna pattern. Thus, a conductive coating (a conductive layer) 18 having conductivity is applied to the outer surface of the radome 11.

Since the conductive coating 18 covers a surface of the substrate 110 (the outer skin 111, the core 112, and the inner skin 113) of the radome 11, the conductive coating 18 avoids friction between the substrate 110 and the flying objects and floating objects 101, and thereby prevents the substrate 110 from being charged.

The conductive coating 18 is grounded to the airframe via the conduction member 20. Even when the conductive coating 18 is charged by friction with the flying objects and floating objects 101, the electrification charge moves to the conduction member 20 through the conductive coating 18, and is further diffused into the airframe.

The conductive coating 18 also has a function to inhibit erosion of the substrate 110 by moisture such as rain, or dust in the atmosphere by covering a surface of the outer skin 111. The conductive coating 18 can prevent a decrease in the power transmittance of the radome 11 due to the moisture or the dust through which radio waves are more difficult to transmit than air.

The conductive coating 18 is formed by applying and drying a paint that is given conductivity by including conductive particles of metal, carbon or the like. For example, a conductive polyurethane paint defined in Type II Antistatic rain erosion resistant coating of Class A and Class B of AMS-C-83231A "Coatings, Polyurethane, Rain Erosion Resistant for Exterior Aircraft and Missile Plastic Parts" can be used as the paint. "AMS" stands for Aerospace Material Specification.

The conductive coating 18 is provided over the entire surface of the substrate 110. To sufficiently fix the conductive coating 18 to the substrate 110, it is preferable to apply the conductive coating 18 onto a surface of a primer layer 17 applied to the outer skin 111. For example, the primer layer 17 is formed of an epoxy resin.

Electrical resistivity can be used as an index of the conductivity of the conductive coating 18. Surface resistivity indicating the electrical resistivity of a surface of the conductive coating 18 is preferably 0.5 MΩ/sq to 15 MΩ/sq. The conductive coating 18 has a thickness of, for example, about several hundreds of pi, and thus, is thin enough that the thickness can be ignored. Therefore, the conductivity of the conductive coating 18 can be evaluated based on the surface resistivity.

When the surface resistivity of the conductive coating 18 is 15 MΩ/sq or less, charge sufficiently moves along the conductive coating 18. It is thus possible to reliably prevent the electrostatic discharge by transferring and diffusing the electrification charge into the airframe.

When the surface resistivity of the conductive coating 18 is 0.5 MΩ/sq or more, it is possible to suppress interference of the conductive coating 18 with radio waves. Thus, the power transmittance required in the radome 11 can be ensured.

The conductive coating 18 preferably has a thickness of 0.31 to 0.36 mm. When the conductive coating 18 is formed with a thickness in the above range, the surface resistivity (volume resistivity) of the conductive coating 18 falls within the range of 0.5 MΩ/sq to 15 MΩ/sq, and radio wave transmittance of almost 90% or 90% or more is ensured.

Various paints can be used as the conductive paint used for the conductive coating 18 in consideration of electrical resistivity, workability or the like. For example, a paste or liquid conductive paint can be used.

A top coating 19 can be further applied to the surface of the conductive coating 18. The top coating 19 is applied onto the entire surface of the conductive coating 18. Since the top coating 19 is sufficiently thin, charge electrified on the top coating 19 by friction with the flying objects and floating objects 101 moves to the conductive coating 18. Since a transfer path for the electrification charge is ensured by the conductive coating 18, it is not necessary to give conductivity to the top coating 19. It is preferable to select, as the top coating 19, a paint appropriate for improving appearance.

A larger load is applied to the front end of the radome 11 than another portion of the radome 11 by impact of raindrops, snow, sand and dust, or the like since the front end confronts an airflow. It is necessary to prevent the conductive coating 18 from being stripped upon receiving the load for a long period of time, resulting in erosion of the substrate 110 by moisture, sand and dust, or the like. Therefore, a rain erosion boot 21 that covers the conductive coating 18 is provided in a predetermined region located at the front end of the radome 11 (a center portion of the radome 11). Since an installation range of the rain erosion boot 21 is limited as described above, an increase in weight of the radome 11 can be suppressed.

The rain erosion boot 21 includes resin such as polyurethane and polyethylene as a main material 21A, and is formed in a film shape. The main material 21A of the rain erosion boot 21 has an insulating property. A material in which a plurality of polymer layers having different characteristics are laminated so as to endure erosion by rain impact or sand and dust can be suitably used as the main material 21A of the rain erosion boot 21.

The rain erosion boot 21 has a thickness of, for example, 0.1 mm to 1 mm. When the radar of the present embodiment is a radar using a frequency band of 10 GHz, a used wavelength λ is about 30 mm. It is preferable to set the thickness of the rain erosion boot to 0.3 mm or less that is $\frac{1}{100}$ of the used wavelength.

The rain erosion boot 21 is formed in a shape corresponding to the shape of the front end of the radome 11, and covers a center region 18A of the conductive coating 18 via the top coating 19. The strips 14 described above are arranged via the top coating 19 in an annular region 18B of the conductive coating 18 that extends around the rain erosion boot 21.

The rain erosion boot 21 is bonded to the top coating 19 by an adhesive layer (not shown) that is formed on a back side of the rain erosion boot 21. When the adhesive layer is not formed, the rain erosion boot 21 can be bonded to the top coating 19 by using an appropriate adhesive.

The rain erosion boot 21 is replaced with a new rain erosion boot at fixed intervals or according to need at the time of maintenance. When replaced, the rain erosion boot 21 bonded to the radome 11 is stripped from the radome 11, and the new rain erosion boot 21 is mounted to the same position.

The rain erosion boot 21 is given conductivity by mixing conductive particles or a conductive filler of metal, carbon or the like into the main material 21A having an insulating property, performing surface treatment on the main material 21A, or providing a sheet having conductivity on a surface of the main material 21A.

As the particles mixed into the rain erosion boot 21 in order to give conductivity, a metal oxide (for example, a silver oxide, and a zinc oxide) obtained by oxidizing a surface for preventing corrosion (electrolytic corrosion) may be used.

A polymer antistatic agent for compatibilizing (alloying) a polymer having a hydrophilic segment with resin can also exert conductivity for passing static electricity by lowering the surface resistivity and the volume resistivity of an insulating material similarly to the carbon particles and the metal filler. The polymer antistatic agent can be also mixed into the rain erosion boot 21 of the present embodiment, or can be used for the surface treatment of the rain erosion boot 21.

The surface treatment of the main material 21A includes formation of a thin film on the surface of the main material 21A by plating, chemical vapor deposition, physical vapor deposition or the like by using a conductive material such as a metal material like gold and silver, carbon, and ITO (indium tin oxide).

For example, expand metal obtained by slitting and stretching a metal sheet can be used as the conductive sheet provided on the surface of the main material 21A. A grid opening is formed in the expand metal. A radio wave having a frequency fitted to the dimension of the opening can be selectively transmitted.

Regarding the surface treatment, more specifically, it is preferable to give conductivity to all of an outer surface (a surface on which raindrops or the like impact) of the main material 21A, a side surface forming an outer periphery of the main material 21A, and a surface (a back surface) of the main material 21A laminated on the conductive coating 18. However, as long as a path is formed through which charge electrified on the rain erosion boot 21 can move from the rain erosion boot 21 to the conductive coating 18, it is also possible to give conductivity only to the outer surface without giving conductivity to one or both of the side surface and the back surface.

As an index of the conductivity of the rain erosion boot 21, surface resistivity can be used similarly to the conductive coating 18. The surface resistivity of the rain erosion boot 21 is preferably 0.5 MΩ/sq to 15 MΩ/sq.

The rain erosion boot 21 is grounded to the airframe via the conductive coating 18 and the conduction member 20. Specifically, a layer having conductivity applied to the surface of the main material 21A, or a network-shaped charge transfer path formed by a molecular structure of the conductive filler mixed into the main material 21A is grounded to the airframe via the conductive coating 18 and the conduction member 20. Both the adhesive layer and the top coating 19 interposed between the rain erosion boot 21 and the conductive coating 18 have a sufficiently small thickness of 0.3 mm or less in order not to generate an influence on radio waves. Even when the adhesive layer and the top coating 19 do not have conductivity, the charge electrified on the rain erosion boot 21 sufficiently moves to the conductive coating 18 through the adhesive layer and the top coating 19 by capacitive coupling between the rain erosion boot 21 and the conductive coating 18 between which the adhesive layer and the top coating 19 are sandwiched.

The present embodiment has a main feature that the rain erosion boot 21 is given conductivity. An operation obtained by the feature is described.

As shown in FIG. 2, the rain erosion boot 21 is charged by friction with the flying objects such as raindrops, snow, hail, dust and sand, and the floating objects such as volcanic ash (referred to as the flying objects and floating objects below) 101. Since the main material 21A of the rain erosion boot 21 has an insulating property, electrification charge 103 is kept in the rain erosion boot 21, and gradually accumulated.

Also, when the aircraft 10 approaches a thundercloud 102, charge deviation occurs in the rain erosion boot 21 corresponding to electrification charge in the thundercloud 102. Thus, the rain erosion boot 21 is rapidly charged.

When an electric field by the charge electrified on the rain erosion boot 21 as described above exceeds a dielectric breakdown strength of the rain erosion boot 21, the electrification charge causes an electrostatic discharge from a peripheral edge of the rain erosion boot 21 toward the grounded conductive coating 18.

However, since the rain erosion boot 21 is given conductivity in the present embodiment, the electrification charge can be transferred to outside of the rain erosion boot 21 before an electric field strength by the electrification charge reaches the dielectric breakdown strength. Accordingly, the electrostatic discharge can be prevented from occurring.

The charge 103 electrified on the rain erosion boot 21 moves to the grounded conductive coating 18 from a peripheral edge portion of the rain erosion boot 21, for example, as indicated by an arrow in FIG. 2, and is diffused into the airframe via the conductive coating 18 and the conduction member 20.

When the conductive filler or the like of metal, carbon or the like is mixed into the main material 21A of the rain erosion boot 21, the charge electrified on the surface of the rain erosion boot 21 moves to the back surface side of the rain erosion boot 21. The electrification charge then moves to the conductive coating 18 facing the back surface, and is diffused into the airframe.

If the rain erosion boot 21 is not given conductivity, the electrostatic discharge may occur from the rain erosion boot 21 toward the conductive coating 18. If a pinhole is thereby formed in the conductive coating 18 or the substrate 110, erosion is caused in the substrate 110 by the flying objects and floating objects 101. That is, while the rain erosion boot 21 is provided in order to reliably protect the substrate 110 of the radome 11 from erosion, the meaning of providing the rain erosion boot 21 is lost if the electrostatic discharge occurs due to the charge electrified on the rain erosion boot 21 and the erosion is caused in the substrate 110. When the electrostatic discharge occurs, noise may also be mixed into radio waves.

When the rain erosion boot 21 is given conductivity as in the present embodiment, it is possible to prevent the occurrence of the electrostatic discharge by diffusing into the airframe the charge electrified on the rain erosion boot 21 by the friction with the flying objects and floating objects 101 as described above. Accordingly, an erosion prevention effect demanded in the rain erosion boot 21 can be secured. It is thus possible to reliably protect the substrate 110 of the radome 11 from the erosion by the flying objects and floating objects 101 even when the radome 11 is used for a long period of time.

When the surface resistivity of the rain erosion boot 21 is 15 MΩ/sq or less, charge sufficiently moves along the rain erosion boot 21. Thus, the electrification charge can be reliably transferred and diffused into the airframe via the conductive coating 18 and the conduction member 20.

When the surface resistivity of the rain erosion boot 21 is 0.5 MΩ/sq or more, it is possible to suppress interference of the rain erosion boot 21 with radio waves. Thus, the power transmittance required in the radome 11 can be ensured.

The rain erosion boot 21 is grounded to the airframe via the conductive coating 18 and the conduction member 20 as described above. The conduction member 20 constitutes a path for grounding both of the strip 14 and the conductive coating 18 to the airframe.

In the following, a configuration of the conduction member 20 is described.

The conduction member 20 includes the fastener 15, the sleeve 16, a nut 151, a washer 152, a ground bar 22, and conductive sealant layers 181 and 221. All of the constituent elements have conductivity. The fastener 15, the sleeve 16, the nut 151, the washer 152, and the ground bar 22 are formed of a metal material.

The fastener 15 has a head portion 15A that is provided in the strip 14 arranged on the outer surface of the radome 11, and a shaft portion 15B that projects from the sleeve 16 on an inner side of the radome 11.

The sleeve 16 penetrates the substrate 110 of the radome 11 in the thickness direction, and has an end surface 16A located on an outer side of the radome 11, and an end surface 16B located on the inner side of the radome 11.

The nut 151 is provided on the shaft portion 15B of the fastener 15.

The washer 152 is interposed between the nut 151 and the ground bar 22.

The ground bar 22 is a band plate-shaped member that extends from the position of the fastener 15 to a portion of the airframe where the ground bar 22 can be grounded. One end side of the ground bar 22 is fastened to the radome 11 along with the strip 14 in a state sandwiched between the nut 151 and the end surface 16B of the sleeve 16. A hole for passing the fastener 15 is formed on the one end side of the ground bar 22. The other end side of the ground bar 22 is electrically connected to a metal member constituting the airframe, such as a skin, a frame, and a stringer.

Both of the conductive sealant layers 181 and 221 are formed by applying and drying a sealant material that is given conductivity by including metal particles.

The conductive sealant layer 221 is provided between the ground bar 22 and the end surface 16B of the sleeve 16. The conductive sealant layer 221 is in close contact with the shaft portion 15B of the fastener 15. Electrical conduction between the ground bar 22 and the fastener 15 is reliably effected via the conductive sealant layer 221. The conductive sealant layer 221 can be applied to the end surface 16B of the sleeve 16 before or after passing the fastener 15 through the sleeve 16.

On the other hand, the conductive sealant layer 181 is provided between the end surface 16A of the sleeve 16 located on the outer side of the radome 11 and the top coating 19. The conductive sealant layer 181 is in close contact with the shaft portion 15B of the fastener 15 and the conductive coating 18. Electrical conduction between the conductive coating 18 and the fastener 15 is reliably effected via the conductive sealant layer 181.

When the strip 14 and the ground bar 22 are fixed to the radome 11, the strip 14 is arranged on the outer surface of the radome 11 to which the conductive coating 18 and other necessary coatings are applied, and the ground bar 22 is arranged on the inner side of the radome 11. The fastener 15 penetrating the strip 14, the conductive coating 18, the radome 11, and the ground bar 22 is tightened into the nut 151. The fastener 15, the sleeve 16, the nut 151, the washer 152, the ground bar 22, and the conductive sealant layers 181 and 221 constituting the conduction member 20 are thereby integrated to form a conduction path through which the charge can be transferred to the airframe.

Any of a large current of lightning entering the strip 14, and charge electrified on the outer surface of the radome 11 can be passed to the airframe through the conduction member 20.

The charge electrified on the rain erosion boot 21 moves to the conductive coating 18 from the rain erosion boot 21. Both of the charge moving to the conductive coating 18 from the rain erosion boot 21, and the charge electrified on the outer surface of the radome 11 extending around the rain erosion boot 21 move to the inner side of the radome 11 from the conductive coating 18 along the fastener 15 in which electrical conduction with the conductive coating 18 is effected via the conductive sealant layer 181. The charge further moves to the ground bar 22 in which electrical conduction with the fastener 15 is effected via the conductive sealant layer 221, and is finally diffused into the airframe.

The configuration of the conduction member 20 of the present embodiment is merely one example, and the conduction member 20 may be composed of various members. The conduction member does not always need to include the fastener 15.

[Modification of the First Embodiment]

In a modification of the first embodiment, hydrophilicity is given to the rain erosion boot 21 instead of the conductivity. When hydrophilicity is given, the rain erosion boot 21 is prevented from being charged with static electricity.

Examples of a method for giving hydrophilicity to the rain erosion boot 21 include a method of mixing a surfactant into the main material 21A.

The surfactant forms a film that easily absorbs water on the surface of the rain erosion boot 21, or prevents friction by making the surface of the rain erosion boot 21 smooth, to thereby suppress generation of static electricity.

It is only necessary to give hydrophilicity to a surface exposed to the atmosphere of the rain erosion boot 21. The side surface of the rain erosion boot 21 and the back surface facing the conductive coating 18 may not be given hydrophilicity.

The rain erosion boot 21 that is given hydrophilicity has a hydrophilic layer that adsorbs moisture in the atmosphere.

When the hydrophilic layer is formed on the rain erosion boot 21, the charge electrified on the rain erosion boot 21 by friction with raindrops or sand is neutralized by ion of water adsorbed to the hydrophilic layer. The electrification charge can be removed by the action before the electric field strength by the electrification charge reaches the dielectric breakdown strength. Accordingly, the electrostatic discharge can be prevented from occurring. Since the erosion prevention effect demanded in the rain erosion boot 21 can be thereby secured, it is possible to reliably protect the substrate 110 of the radome 11 from the erosion by the flying objects and floating objects 101 even when the radome 11 is used for a long period of time.

The rain erosion boot 21 of the first embodiment is not limited to the radome 11 composed of the sandwich panel, and may be applied, for example, to a thin-film radome having a sufficiently small sheet thickness with respect to a wavelength, and a half-wavelength resonance radome whose sheet thickness is designed such that a phase difference, at a particular used frequency, of a reflected wave between a front surface and a back surface of the radome is 180°.

Second Embodiment

Next, a second embodiment of the present invention is described.

Figure 4A:
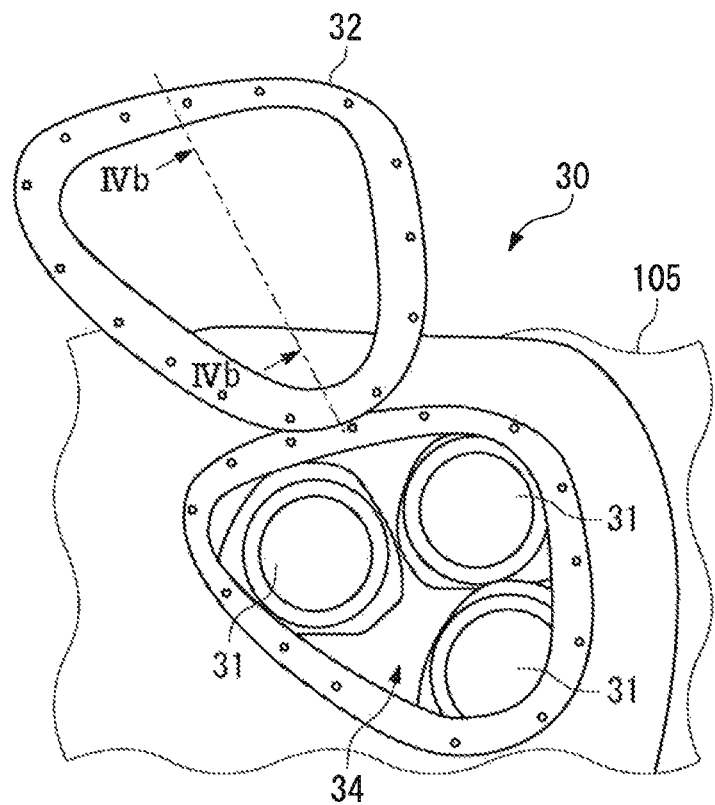
FIGS. 4A and 4B are views illustrating a lighting device of an aircraft according to a second embodiment of the present invention.

FIG. 4A shows a lighting device 30 of the aircraft according to the second embodiment. The lighting device 30 corresponds to a landing light and a taxiing light provided at a proximal end of a main wing 105 of the aircraft. An anti-collision strobe light and a navigation light are also provided on a distal end (tip) side of the main wing 105.

The lighting device 30 includes lights (an aircraft member) 31 that are provided in a light accommodation section 34 provided at a base of the main wing 105, and a lens cover (an aircraft member cover) 32 that covers and protects the lights 31 and diffuses light emitted from the lights 31. The lens cover 32 is provided so as to be openable and closable on the airframe. Since the lights 31 are provided uncovered inside the lens cover 32, it is necessary to ensure a waterproof property of the lighting device 30. A gap between a peripheral edge portion of the lens cover 32 and the airframe is sealed by a waterproof sealant. The lens cover 32 itself is also required to have a waterproof property.

The lighting device 30 includes the three lights 31. The number of the lights 31 is not particularly limited. The type of a light source of the light 31 is also not particularly limited.

Figure 4B:
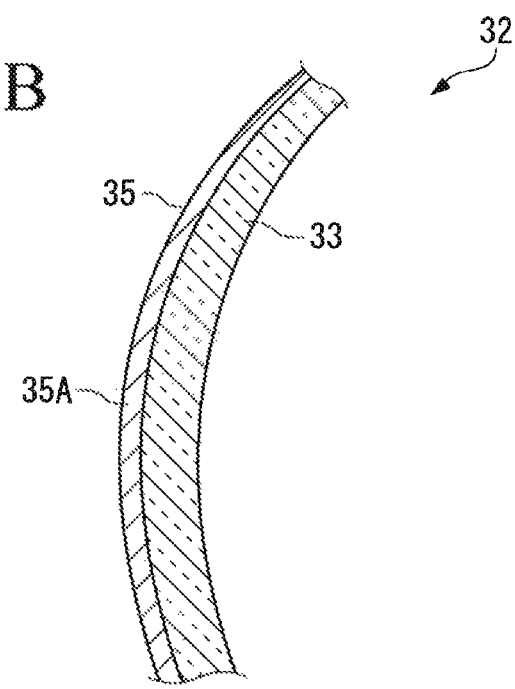

The lens cover 32 includes a substrate 33 and a rain erosion boot 35 as shown in FIG. 4B.

The substrate 33 of the lens cover 32 is formed of a resin material having an insulating property. For example, a resin material such as acrylic and polycarbonate can be used as a material of the substrate 33. A stretched acrylic member whose strength is increased by stretching a member formed of acrylic may be used as the substrate 33.

The film-shaped rain erosion boot 35 that is given conductivity is provided on an outer surface of the substrate 33.

The rain erosion boot 35 is provided over the entire outer surface of the substrate 33.

The rain erosion boot 35 protects the substrate 33 from abrasion and erosion by impact of raindrops, sand and dust, or the like.

The rain erosion boot 35 includes insulating resin such as polyurethane and polyethylene as a main material 35A. The rain erosion boot 35 is formed transparent, or semitransparent enough to transmit a large portion of the light emitted from the lights 31. A material in which a plurality of polymer layers having different characteristics are laminated so as to endure erosion by rain impact or sand and dust can be suitably used as the main material 35A of the rain erosion boot 35.

The rain erosion boot 35 is given conductivity by mixing conductive particles or a conductive filler of metal, carbon or the like into the main material 35A, or performing surface treatment on the main material 35A similarly to the rain erosion boot 21 of the first embodiment. The surface resistivity of the rain erosion boot 35 is preferably 0.5 MΩ/sq to 15 MΩ/sq.

The rain erosion boot 35 is grounded to the airframe via a conduction member (not shown).

Since the rain erosion boot 35 is given conductivity, charge electrified on the rain erosion boot 35 by friction with raindrops, snow, or sand can be transferred to outside of the rain erosion boot 35 before an electric field strength by the electrification charge reaches a dielectric breakdown strength. The charge electrified on the rain erosion boot 35 is diffused into the airframe via the conduction member (not shown), so that occurrence of an electrostatic discharge by the charge electrified on the rain erosion boot 35 can be prevented. Therefore, the rain erosion boot 35 can protect the substrate 33 of the lens cover 32 from abrasion and erosion without causing a problem that the substrate 33 of the lens cover 32 is damaged by the electrostatic discharge. Since the abrasion and the erosion of the substrate 33 are avoided, the substrate 33 maintains required light transmittance and light diffusing performance. Brightness and an illumination angle set for the lighting device 30 can be thereby maintained.

Hydrophilicity may be given to the rain erosion boot 35 instead of the conductivity similarly to the rain erosion boot 21 in the modification of the first embodiment.

When a hydrophilic layer is formed on a surface of the rain erosion boot 35, the charge electrified on the rain erosion boot 35 by friction with raindrops, snow, or sand is neutralized by ion of water adsorbed to the hydrophilic layer. The electrification charge can be removed by the action before the electric field strength by the electrification charge reaches the dielectric breakdown strength. Accordingly, the electrostatic discharge can be prevented from occurring. Therefore, similarly to the case in which the rain erosion boot 35 is given conductivity, the rain erosion boot 35 can protect the substrate 33 of the lens cover 32 from abrasion and erosion without causing a problem that the substrate 33 of the lens cover 32 is damaged by the electrostatic discharge.

A conductive coating thin enough to transmit light may also be applied to an outer surface of the lens cover 32 of the second embodiment, and the rain erosion boot 35 may be provided so as to cover a surface of the conductive coating. In this case, the conductive coating may be applied to the entire outer surface of the lens cover 32, and the rain erosion boot 35 may be provided only in a portion to which a larger load is applied than another portion by impact of raindrops, sand, or the like.

Although the lighting device 30 used as the landing light and the taxiing light has been described above as an example, the rain erosion boot 35 may also be applied to a lens cover of, for example, an aeronautical light indicating positions of end portions of right and left main wings 105 and 106 (FIG. 1), or a position of a tail of the aircraft, a logo light illuminating a logo of an airline displayed on the tail, anti-collision strobe lights provided on an upper portion and a lower portion of a fuselage, a landing light illuminating a front side, or a wing illuminating light illuminating the main wing.

The constitutions described in the aforementioned embodiments may also be freely selected or changed into other constitutions as appropriate without departing from the gist of the present invention.

The rain erosion boot that is given conductivity according to the present invention is not limited to the radome covering the antenna of the radar system, and can be used for protecting a cover which covers various antennas from erosion.

The rain erosion boot according to the present invention is also not limited to the antenna cover and the lens cover for lights, and can be applied to a cover which covers various members mounted in the aircraft.

For example, a rain erosion boot that is given conductivity and is formed colorless and transparent similarly to the above rain erosion boot 35 can be used for a lens cover for protecting a lens of a camera that is installed on an outer side of the airframe of the aircraft in order to perform various measurements or take an aerial photograph. Accordingly, a substrate of the lens cover can be protected from abrasion and erosion by the rain erosion boot without causing damage to the substrate of the lens cover by an electrostatic discharge, and a photographing object can be clearly photographed.

Moreover, in the present invention, the rain erosion boot 21 may be directly provided on the surface of the radome 11 without forming the conductive coating 18 on the radome 11 at least on the back side of the rain erosion boot 21.

For example, by mixing the polymer antistatic agent, or the carbon or metal particles described above into the rain erosion boot 21 in an amount small enough not to affect radio wave properties, a network-shaped path for transferring the charge electrified on the rain erosion boot 21 is formed. When the path is grounded to the airframe structure, the charge electrified on the rain erosion boot 21 is removed.

The aircraft includes a helicopter having rotor blades in addition to the aircraft having fixed wings.

The present invention can be applied to a conveyance such as a ship, a train and an automobile, or a missile etc. in addition to the aircraft.

What is claimed is:

1. An antenna cover of an aircraft comprising:
a cover that protects an antenna mounted in the aircraft;
a conductive layer having conductivity that is provided on an outer side of the cover; and
a rain erosion boot that covers one region of the conductive layer, wherein the rain erosion boot does not entirely cover the conductive layer,
wherein the rain erosion boot includes a main material having an insulating property, is given conductivity, and is grounded to an airframe via the conductive layer, or
the rain erosion boot includes a main material having an insulating property, and is given hydrophilicity.

2. The antenna cover of an aircraft according to claim 1, wherein the rain erosion boot covers a forward-most portion of the cover.

3. An antenna cover of an aircraft comprising:
a cover that protects an antenna mounted in the aircraft;
a conductive layer having conductivity that is provided on an outer side of the cover; and
a rain erosion boot that covers one region of the conductive layer,
wherein the rain erosion boot includes a main material having an insulating property, is given conductivity, and is grounded to an airframe via the conductive layer,
wherein the rain erosion boot comprises:
conductive particles mixed into the main material that give the rain erosion boot conductivity; or
a conductive filler mixed into the main material that gives the rain erosion boot conductivity.

4. An antenna cover of an aircraft comprising:
a cover that protects an antenna mounted in the aircraft;
a conductive layer having conductivity that is provided on an outer side of the cover; and
a rain erosion boot that covers one region of the conductive layer,
wherein the rain erosion boot includes a main material having an insulating property, and is given hydrophilicity, and
wherein the rain erosion boot comprises a surfacant mixed into the main material that gives the rain erosion boot hydrophilicity.

5. A member cover of an aircraft comprising:
a cover that protects a member mounted in the aircraft; and
a rain erosion boot that covers an outer side of the cover,
wherein the rain erosion boot includes a main material having an insulating property, and is given conductivity,
wherein the member is a lighting device emitting light,
wherein the light emitted from the lighting device is transmitted through the cover, and
wherein the rain erosion boot comprises:
conductive particles mixed into the main material that give the rain erosion boot conductivity; or a conductive filler mixed into the main material that gives the rain erosion boot conductivity.

6. A member cover of an aircraft comprising:

a cover that protects a member mounted in the aircraft; and a rain erosion boot that covers an outer side of the cover, wherein the rain erosion boot includes a main material having an insulating property, and is given hydrophilicity, wherein the member is a lighting device emitting light, wherein the light emitted from the lighting device is transmitted through the cover, and wherein the rain erosion boot comprises a surfacant mixed into the main material that gives the rain erosion boot hydrophilicity.

7. The antenna cover of an aircraft according to claim 3, wherein surface resistivity of the rain erosion boot is 0.5 MΩ/sq to 15 MΩ/sq.

8. The antenna cover of an aircraft according to claim 3, wherein the conductive layer has a portion that is covered with the rain erosion boot, and a portion where a lightning protection member through which a current of lightning striking the cover flows is arranged, and the conductive layer is grounded to the airframe via a fastener that penetrates the conductive layer in a thickness direction and fastens the lightning protection member to the cover.

9. The antenna cover of an aircraft according to claim 8, wherein the lightning protection member is a strip made of metal.

10. The antenna cover of an aircraft according to claim 1, wherein the antenna is mounted at a front end of the airframe, the cover is formed in a bowl shape so as to cover the antenna from a front side, the conductive layer is applied to an entire outer surface of the cover, and the rain erosion boot is provided in a predetermined region located at a front end of the cover.

11. The antenna cover of an aircraft according to claim 1, wherein the rain erosion boot comprises a resin as the main material.

12. The antenna cover of an aircraft according to claim 11, wherein the rain erosion boot is formed of a plurality of polymer layers having different characteristics.

13. The antenna cover of an aircraft according to claim 1, wherein the conductive layer has a thickness of 0.31 to 0.36 mm, and the rain erosion boot has a thickness of 0.1 mm to 1 mm.

14. The antenna cover of an aircraft according to claim 13, wherein the rain erosion boot has a thickness of 0.1 mm to 0.3 mm.

15. An aircraft comprising the antenna cover according to claim 1.

16. An aircraft comprising the member cover according to claim 3.

17. An aircraft comprising the member cover according to claim 4.

18. An aircraft comprising the member cover according to claim 5.

19. The antenna cover of an aircraft according to claim 5, wherein surface resistivity of the rain erosion boot is 0.5 MΩ/sq to 15 MΩ/sq.

* * * * *